Feb. 7, 1961   J. E. HORSTE   2,970,866
PIN-BUSHING STRUCTURE
Filed April 27, 1960
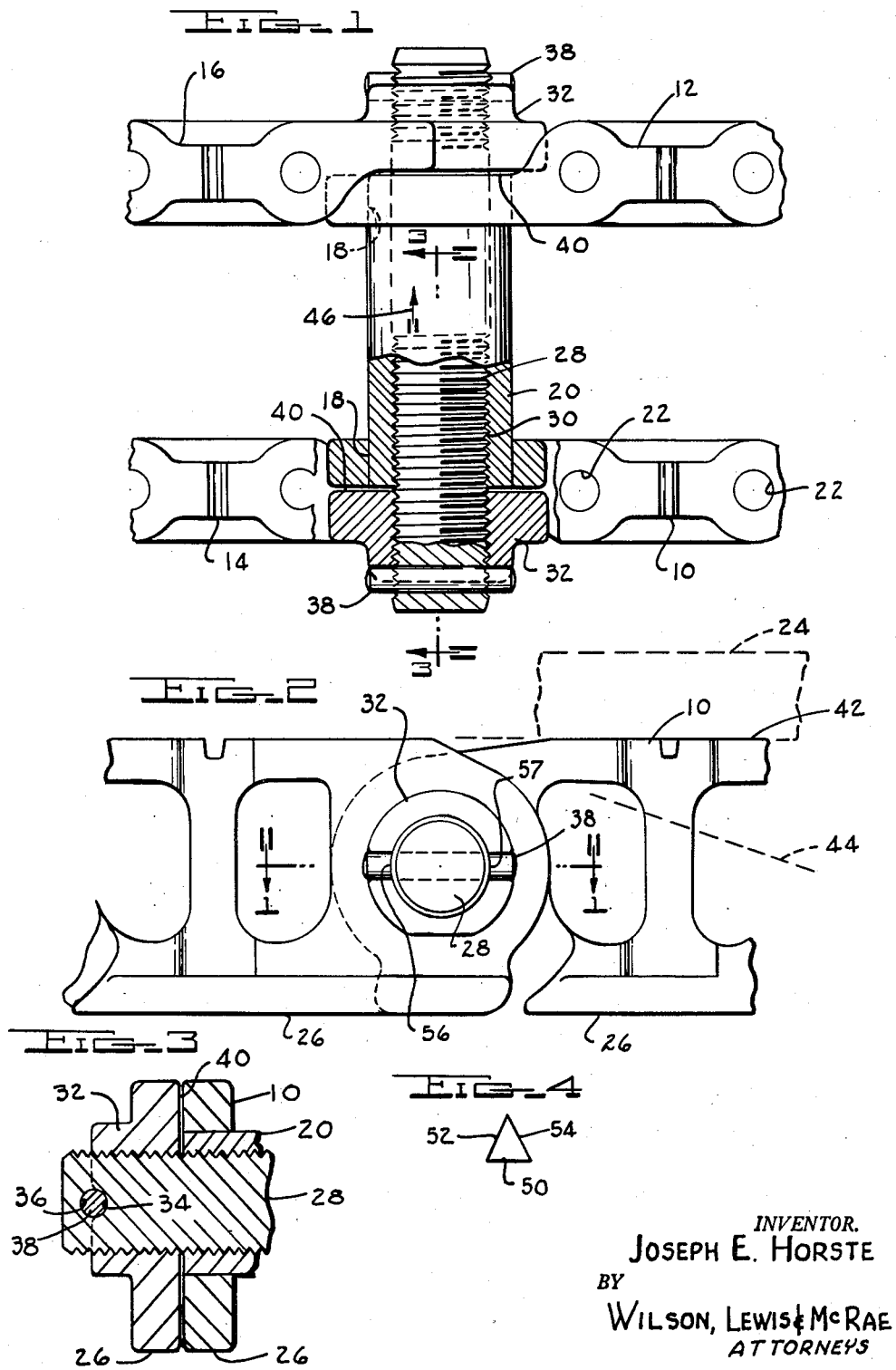
INVENTOR.
JOSEPH E. HORSTE
BY
WILSON, LEWIS & McRAE
ATTORNEYS

United States Patent Office 2,970,866
Patented Feb. 7, 1961

2,970,866

PIN-BUSHING STRUCTURE

Joseph E. Horste, 10535 Savage Road, Belleville, Mich.

Filed Apr. 27, 1960, Ser. No. 25,134

4 Claims. (Cl. 305—11)

This invention relates to vehicle construction and particularly to vehicle constructions utilizing endless track or tread elements as the ground-engaging medium. Vehicles of this type are commonly employed in such applications as tanks and other ordnance equipment, bulldozers and other earth moving equipment, agricultural equipment, and certain hauling equipment.

Each of the treads for this type vehicle is usually carried on an endless linkage construction which is trained around two or more vehicle sprockets so as to define an upper horizontal run, a lower horizontal run, and two arcuate inter-connecting runs at opposite ends of the horizontal runs. One of the sprockets is power driven so as to provide motive power for advancing the treads in a manner to propel the vehicle forwardly or backwardly.

The tread-supporting linkage comprises a series of separate links pivotally connected with one another by means of bushings and pivot pins. The two horizontal runs for the treads are provided with guide rollers which engage guide surfaces on the links to support and guide them during their movements.

The vehicles are of relatively heavy construction, and severe loads are imposed on the links and connector pins. The wear on the pins is particularly severe, and in actual practice the connector pins frequently will wear out long before completion of the useful life of the linkages. In the usual situation the pin life may be as little as one half of the linkage life.

The factors which enter into the short pin life involve usual considerations, such as hardness of the pins, and care in the pin-linkage manufacturing operations. However the problem is aggravated by the fact that a considerable quantity of dirt, sand, grit and other foreign material necessarily is introduced into the joints between the pins and the linkages, this dirt introduction factor being due to the nature of the vehicles and their predominant use as earth-engaging structures (as distinguished from structures travelling on pavement or other relatively clean surfaces).

The presence of dirt and other foreign material in the pin linkage joint contributes to premature wearing of the pin and linkage, and it is proposed under the present invention to overcome this premature wear by so designing the pin as to better exclude the dirt from the pin-linkage joint. In order to accomplish this object the pin is formed with a series of spiral grooves or threads in its bearing surface, the arrangement being such as to provide a circuitous route for the dirt to travel as it works into the pin-linkage joint. These spiral grooves or threads also serve to lengthen the bearing surface appreciably over the length of a straight bearing surface so that the dirt must travel a further distance in order to cover the bearing surface sufficiently to cause damaging wear.

As above noted, the spiral grooves or threads serve appreciably to increase the total amount of bearing surface. Thus, the improved pin life is achieved not only by excluding the dirt from the bearing surfaces but also by providing a larger bearing area.

A further advantage of utilizing the invention resides in the fact that the pins can be serviced quickly, particularly when it is desired to change the pin position relative to the link on which it is carried. In this connection it is here noted that due to the construction of the links and the relationship of the links to the other parts of the vehicle the wear on the pins is not uniform around the pin periphery.

The pin-linkage assemblies are pulled by the driving sprockets so that the links are in tension. The tension forces impose severe loads on one lateral surface of each pin, with a substantially less load on the remaining pin surface. Thus, the upper and lower surfaces of the pins have substantially less wear than the aforementioned side surface, and it is desirable to compensate for this uneven wear by suitable relocation of the pins at periodic intervals.

Since the pins wear unevenly it is the usual practice to periodically take the vehicle into the shop and rotate the pins 180°, which rotation serves to replace the worn surfaces with fresh bearing surfaces. Conventionally the pins are connected to their links by press fit operations. As a result, the job of rotating the pins can be accomplished only by knocking out the pins from their initial positions and driving them back into new positions while holding them at the desired locations of rotational adjustment. Such operations are time-consuming and require the use of jigs and fixtures for holding the parts during the replacement operations.

Under the present invention the pins are formed with threaded surfaces which permit the pins to be freely rotated or screwed into new positions of adjustment. The arrangement is such that considerable time and money is saved in the pin-repositioning operation.

From the above brief discussion it will be seen that the principal objects of the invention are to provide a vehicle tread linkage-pin arrangement having improved features of dirt exclusion, lengthened pin life, and ease of pin replacement.

Other objects of this invention will appear in the following description and appended claims, reference being had to the accompanying drawings forming a part of this specification wherein like reference characters designate corresponding parts in the several views.

In the drawings:

Fig. 1 is a top plan view of a linkage-pin structure, constructed according to the present invention with parts thereof being sectional along line 1—1 in Fig. 2.

Fig. 2 is a side elevational view of the Fig. 1 construction.

Fig. 3 is a sectional view taken on line 3—3 in Fig. 1.

Fig. 4 is a diagrammatic illustration showing the relative surface areas of a pin having a threaded surface as compared with a pin having a smooth surface.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings there is shown a pin-linkage arrangement including a first link 10, a second link 12, a third link 14 and a fourth link 16. Links 10 and 12 are inter-connected by the bushing 14 which preferably has a press fit in each link as at 18. It will be noted that the links 10 and 12 are each provided with through openings therein to accommodate the bushing 20, and that these links have their end portions offset from the general vertical plane of the links so as to accommodate offset end portions on the adjacent links 14 and 16.

The various links are each provided with a plurality of bores 22 for mounting of the conventional tread structures shown at 24 in dotted lines. The surfaces 26 of the various links are adapted to travel over rollers carried by the vehicle, the arrangement being such as to permit the tread-linkage assembly to travel in an endless orbit or path so as to propel the vehicle over the sub-surface. The drawings show only two sets of inter-connected links, but it will be appreciated that in practice a large number of such links will be employed and inter-connected with one another to provide the endless track-linkage assembly. The usual sprockets and drive means may be employed to drive the link-track assembly around the above-mentioned endless path.

The present invention is concerned primarily with the means for inter-connecting the linkages, and in the illustrated embodiment this connecting means takes the form of a pin 28 which is formed with spiral grooves or threads 30 along its entire length. These threads mesh with similar threads formed in bushing 20 and in the hubs 32 of each of the links 14 and 16.

As best seen in Fig. 3, each of the hubs 32 is formed with a cross groove or notch 34 in its end face, and the threaded pin 28 is formed with a cross bore 36 in each of its ends. By this arrangement a knock-out pin 38 may be driven through each of the cross bores 36 so as to seat within the groove 34 in a manner to retain the threaded pin in fixed relation with respect to lings 14 and 16.

In assembling the various links together the bushing 20 is first driven into the links 10 and 12 to the position shown in Fig. 1. The links 14 and 16 are then positioned with their internally threaded hub portions 32 in alignment with the bushing, and pin 28 is then threaded through the hubs and bushing so as to assume its illustrated position. As the last step in the assembling operation the knock-out pins 38 are driven into the bores 36 in a press fit relationship so as to retain the parts in their assembled positions.

It will be noted from Fig. 1 that a slight clearance space 40 exists between each end face of bushing 20 and the adjacent face of hub 32. This clearance space permits the links to have a slight lateral or axial shift relative to the pin 28 as the respective link turns in its travel between the horizontal runs and end runs. During this turning motion of the links each link has a relative arcuate movement with respect to the adjacent link of about fifteen radial degrees, i.e. the upper surface 42 of link 10 might move from its full line position to the dotted line position 44. During this fifteen degree movement the assembly of link 10, bushing 20 and link 12 tends to advance slightly in the arrow 46 direction. The clearance spaces at 40 are sufficient to accommodate this slight shift of the links and bushing without binding between adjacent faces of the links.

One of the principal advantages of the illustrated construction lies in the long and extensive bearing surfaces provided by the threads 30. Thus, if we compare the total bearing surface provided by threads 30 with the total bearing surface provided by a smooth surface pin of the same diameter and length as pin 28 we find that the total bearing surface of the threaded pin is at least twice as great as the total bearing surface provided by a smooth surfaced pin. Thus, referring to Fig. 4, if we assume that line 50 represents an incremental length of bearing surface on a smooth surfaced pin, the corresponding incremental length of bearing surface of a threaded pin might be the total length of the two lines 52 and 54. These lines 52 and 54 of course correspond with the surfaces of the threads at 30 and serve to visually compare the effective surface area of a threaded pin as compared with the surface area of a smooth-surfaced pin.

It has been previously noted that one object of the invention is to provide a pin-linkage construction having improved ability to exclude dirt from the pin-linkage joint. The illustrated embodiment provides a dirt-exclusion feature by reason of the threaded characteristic of the bearing surfaces. These threaded surfaces provide a circuitous route for the dirt to travel if it is to move into the linkage-pin joint. Additionally, the dirt-exclusion feature is enhanced by the fact that the threads form an extremely long length of bearing surface. It is thus very difficult for dirt and contaminant to reach all portions of the bearing surface, and the pin is thereby enabled to have a relatively long service life.

It has been previously noted that vehicle constructions and tread arrangements are such that the linkage pins do not wear evenly around their peripheries. In the illustrated embodiment the surface portion of the pin denoted generally by numeral 56 will encounter more wear than the portion denoted by numeral 57, and it is desirable to periodically rotate the pin so as to present a new pin surface in the position occupied by surface 56. In order to accomplish this it is only necessary to knock out the small pins 38, manually rotate pin 28 and then redrive the pins 38 into bores 36. This operation is much quicker of accomplishment than corresponding operations in conventional constructions wherein the main pivot pin or shaft must be driven out of the bushing and links while retaining the links in special holding jigs.

The drawings show one cross bore 36 in each end of the pin 28 so as to permit the pin to be rotated into either of two positions. It is contemplated however that additional cross bores could be provided in each end of the pin to permit the pin to be rotated into other positions so as to further increase the life of the pin.

The drawings necessarily show a specific arrangement of parts and a specific construction of each component part, but it will be appreciated that some modification and variation of structure and arrangement can be resorted to without departing from the spirit of the invention as defined by the appended claims.

I claim:

1. In an endless tread construction for vehicles of the type having two parallel rows of links, the combination comprising first and second spaced parallel links having axially aligned hub portions; an internally threaded bushing extending between said hub portions and fixedly secured thereto; third and fourth spaced parallel links arranged in row-forming relationship with respective ones of the first and second links, and having internally threaded hub portions axially aligned with the hub portions of the first and second links; and a threaded pin extending through the last-mentioned hub portions and bushing so as to form a pivotal connection between the bushing and last-mentioned links.

2. The combination of claim 1 wherein the end faces of the last-mentioned hubs are notched, and the end portions of the pin are provided with through bores; the combination further comprising a knock-out pin pressed into each of the bores and seated in the respective notch to retain the threaded pin in fixed relation with respect to the third and fourth links.

3. The combination of claim 1 wherein the hub portions of the third and fourth links are spaced from one another by a distance greater than the length of the bushing to thereby provide clearance spaces between the bushing and the third and fourth hubs for permitting the first and second links to shift axially of the pin during tilting motion of the links about the threaded pin axis.

4. In an endless tread construction for vehicles of the type having two parallel rows of connected links, the combination comprising first and second spaced parallel links having axially aligned hub portions; an internally threaded bushing extending between said hub portions and fixedly secured thereto; third and fourth spaced parallel links arranged in line with respective ones of the first and second links; said third and fourth links having apertured hubs overlapping the hub portions of the first and second links so that the apertured hubs are axially aligning with the bushing; a pivot pin having end portions thereof within the hub apertures and central portions thereof within the bushing; said pin central portions having threads formed thereon to mesh with the bushing threads; and said pin being held against rotation relative to the apertured hubs so that movement of the third and fourth links relative to the bushing causes the pin threads to move within the bushing threads.

References Cited in the file of this patent

UNITED STATES PATENTS

| | | |
|---|---|---|
| 436,008 | Robinson | Sept. 9, 1890 |
| 745,975 | Sweaney | Dec. 1, 1903 |
| 1,289,409 | Davis | Dec. 31, 1918 |
| 2,920,926 | Stevens | Jan. 12, 1960 |

FOREIGN PATENTS

| | | |
|---|---|---|
| 439 | Great Britain | Jan. 9, 1889 |
| 28,293 | France | Oct. 28, 1924 |
| | (Addition to No. 564,248) | |
| 97,792 | Germany | July 6, 1898 |